United States Patent [19]
Lacy

[11] Patent Number: 5,932,845
[45] Date of Patent: Aug. 3, 1999

[54] SAFETY ELECTRICAL OUTLET APPARATUS

[76] Inventor: Brian W. Lacy, 2494 Riceville Rd., Asheville, N.C. 28805

[21] Appl. No.: 08/959,358

[22] Filed: Oct. 28, 1997

[51] Int. Cl.⁶ .................................................. H05K 5/03
[52] U.S. Cl. ............................................ 174/67; 220/242
[58] Field of Search .............................. 174/67; 220/242; 439/135, 147, 373, 915

[56] References Cited

U.S. PATENT DOCUMENTS

| | | | |
|---|---|---|---|
| 2,878,456 | 3/1959 | Cormier | 439/142 |
| 3,317,881 | 5/1967 | Setecka | 174/67 X |
| 3,656,083 | 4/1972 | Brook | 439/147 |
| 3,927,275 | 12/1975 | Deitch et al. | 179/97 |
| 3,956,573 | 5/1976 | Myers et al. | 174/67 X |
| 4,250,349 | 2/1981 | Bennett | 174/67 |
| 4,293,733 | 10/1981 | Royer | 174/67 |
| 4,302,624 | 11/1981 | Newman | 174/67 |
| 4,607,136 | 8/1986 | Thomas | 174/67 |
| 4,733,017 | 3/1988 | Wolfe-Taylor et al. | 174/67 |
| 4,793,818 | 12/1988 | Poirier | 174/67 X |
| 4,895,527 | 1/1990 | Brown et al. | 439/147 |
| 4,952,756 | 8/1990 | Meyers | 174/67 |
| 4,981,439 | 1/1991 | Piedmont | 174/67 X |
| 5,067,907 | 11/1991 | Shotey | 174/67 X |
| 5,078,614 | 1/1992 | Shotey | 174/67 X |
| 5,107,075 | 4/1992 | Currier, Jr. | 174/67 |
| 5,212,347 | 5/1993 | Powers et al. | 174/67 |
| 5,589,665 | 12/1996 | Scamacca | 174/67 X |

FOREIGN PATENT DOCUMENTS 1198670  7/1970  United Kingdom ............... 439/135 X

*Primary Examiner*—Dean A. Reichard
*Attorney, Agent, or Firm*—Carter & Schnedler, P.A.

[57] ABSTRACT

There is provided an electrical outlet apparatus including a plate having a pair of openings therein which are adapted to be placed in register with a pair of adjacent wall mounted electrical receptacles. A first land surrounds the first opening and a second land surrounds the second opening. Each land includes a well therethrough which is aligned with one of the openings in the plate. The lands are dimensioned to receive a standard, preferably three-prong, plug with minimal clearance for the plug. The thickness of each land is such that the plug cannot be energized unless the exposed contacts are below the top surface of the land. One of the lands is removable from the plate so that a larger, nonstandard plug may be inserted through one of the openings without having to remove the entire apparatus from the wall; A latchable slidable cover is received over each land. When a cover is closed and latched, access to the well in the corresponding land is denied, and when the cover is opened and unlatched, access to the well in the corresponding land is permitted.

19 Claims, 6 Drawing Sheets

SAFETY ELECTRICAL OUTLET APPARATUS

BACKGROUND OF THE INVENTION

This invention relates to electrical outlet safety devices. More particularly, it relates to electrical outlet safety apparatus which inhibit access to an unused outlet and prevent contact with energized plug prongs.the risk of shock.

Each year, thousands of people, including many children, receive an electrical shock when they (a) touch an exposed energized plug prong which is connected to a wall mounted receptacle, or (b) insert a metal object into an unused receptacle. Contact with a plug prong may occur when the plug prongs are only partially inserted into the receptacle, thereby leaving a portion of the plug prongs exposed. Contact with a receptacle may occur because an unused receptacle is normally uncovered, thereby presenting an open invitation for a child to insert something into the receptacle.

There have been various attempts to eliminate or reduce these problems. One approach is to provide a wall outlet having extended rings surrounding each receptacle, as taught in U.S. Pat. No. 4,981,439 issued to Piedmont. The extended rings hide the energized plug contacts. In addition, Piedmont teaches the use of a cap to be placed over the extended rings when the receptacle is not in use.

Other techniques include the use of a slide cover mechanism to cover the receptacle when not in use, such as the teachings of U.S. Pat. No. 4,793,818 issued to Poirier.

The Piedmont device is usable only with a plug of a certain size, and the Poirier device, while preventing someone from inserting metal objects into the receptacle while the receptacle is not in use, does not prevent electrical shock due to exposed energized plug contacts. In addition, a child may easily move the Poirier slide cover, thereby exposing the receptacle.

OBJECTS OF THE INVENTION

It is therefore one object of this invention to provide an improved safety electrical outlet apparatus.

It is another object of this invention to provide a safety electrical wall outlet apparatus which may be used with oversize plugs without the need to remove the entire apparatus from the wall.

It is still another object of this invention to provide a safety electrical outlet apparatus which is easy to use.

It is yet another object of this invention to provide a safety electrical outlet apparatus which has an attractive appearance, fits smoothly on the profile of the wall, and stands out only slightly.

It is also another object of this invention to provide a safety electrical outlet apparatus which inhibits children from accessing the receptacles. It is further another object of this invention to provide a safety electrical outlet apparatus which is simple and inexpensive.

SUMMARY OF THE INVENTION

In accordance with one form of this invention, there is provided a safety electrical outlet apparatus including a plate having first and second openings therein. The openings in the plate are placed in register with a pair of adjacent wall mounted electrical receptacles. A first land is attached to the plate and surrounds the first opening in the plate. A well is provided through the first land which aligns with the first opening in the plate. The well through the first land is dimensioned to receive a standard, preferably three-prong, plug with minimal clearance for the plug. A second land is removably attached to the plate and surrounds the second opening in the plate. A well is provided through the second land and is aligned with the second opening in the plate. The second opening in the plate is larger than the opening formed by the well in the second land. The well through the second land is dimensioned to receive a standard, preferably three-prong, plug with minimal clearance for the plug. The second land is removable so that a larger, nonstandard plug may be inserted through the second opening in the plate without the need to remove the entire plate from the wall. Each land has a top surface and a predetermined thickness. Preferably, the thickness of each land is such that the plug cannot be energized unless the exposed plug contacts are below the top surface of the land.

In accordance with another form of this inventions, there is provided an electrical outlet apparatus including a plate having first and second openings therein which are adapted to be placed in register with a pair of adjacent wall mounted electrical receptacles. A land is attached to the plate and surrounds the first and second openings in the plate. First and second wells are provided through the land with the first well aligning with the first opening in the plate and the second well aligning with the second opening in the plate. The wells are dimensioned to receive a standard, preferably three-prong, plug with minimal clearance for the plug. At least one cover is provided and is slidably received over the land so as to provide open and closed positions. When the cover is in the closed position, access to at least one of the wells, and thus a receptacle, is denied. When the cover is in the open position, access to at least one of the wells, and thus a receptacle, is permitted.

Preferably, the land is made of two substantially similar parts, with one well being through each part. Also, preferably, the cover includes a latching mechanism for securing the cover in the closed position, which will inhibit children from placing the cover in the open position, but will permit adults to easily do so

BRIEF DESCRIPTION OF THE DRAWINGS

The subject matter which is regarded as the invention is set forth in the appended claims. The invention itself, however, together with further objects and advantages thereof may be better understood in reference to the accompanying drawings in which:

DESCRIPTION OF THE PREFERRED EMBODIMENT

Figure 1:
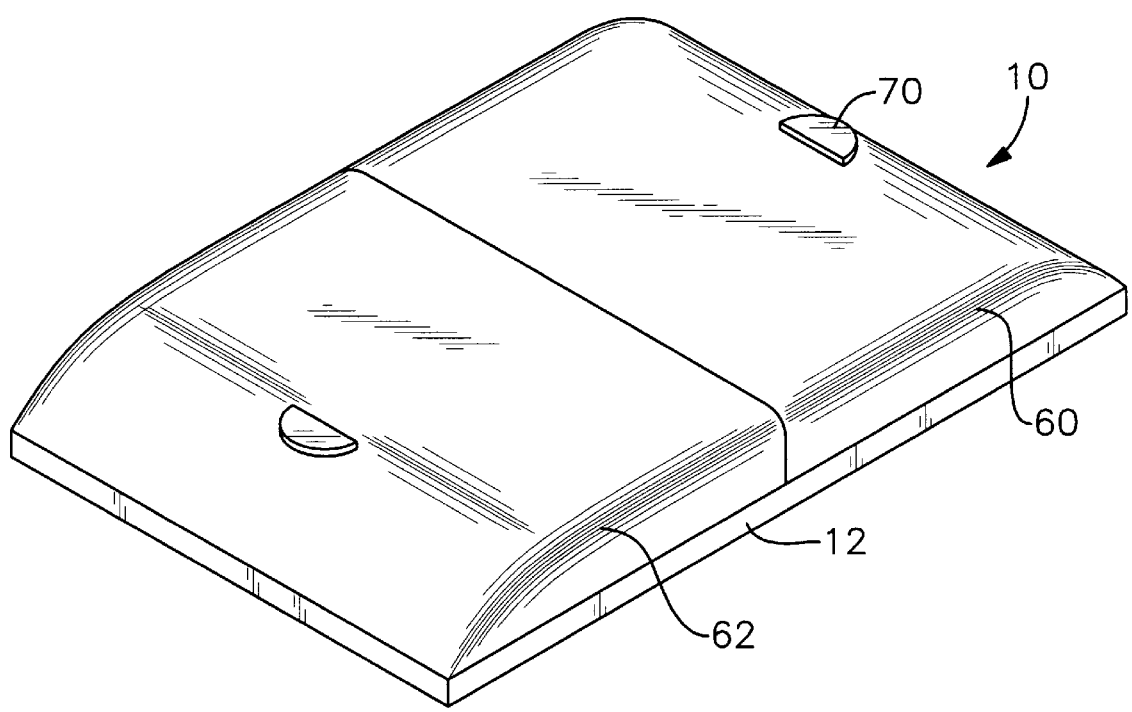
FIG. 1 is a prospective view of the safety electrical outlet apparatus of the subject invention with both covers closed.

Referring now more particularly to FIGS. 1–4 and 9, there is provided safety electrical outlet apparatus 10, including plate 12 having first opening 14 and second opening 16. The first and second openings 14 and 16 are substantially the same size and shape as the receptacle openings for a standard electrical wall plate.

Figure 8:
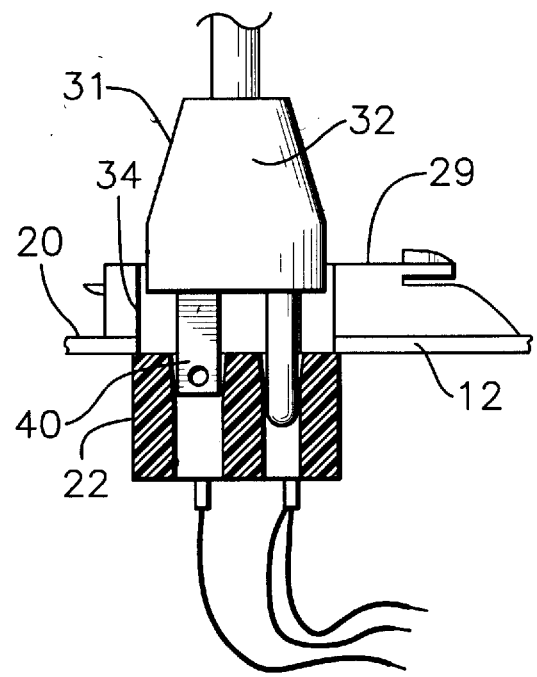
FIG. 8 is a partial side elevational view, with parts cut away, showing a plug received in a receptacle with access to the plug contacts being blocked by a land.
Figure 9:
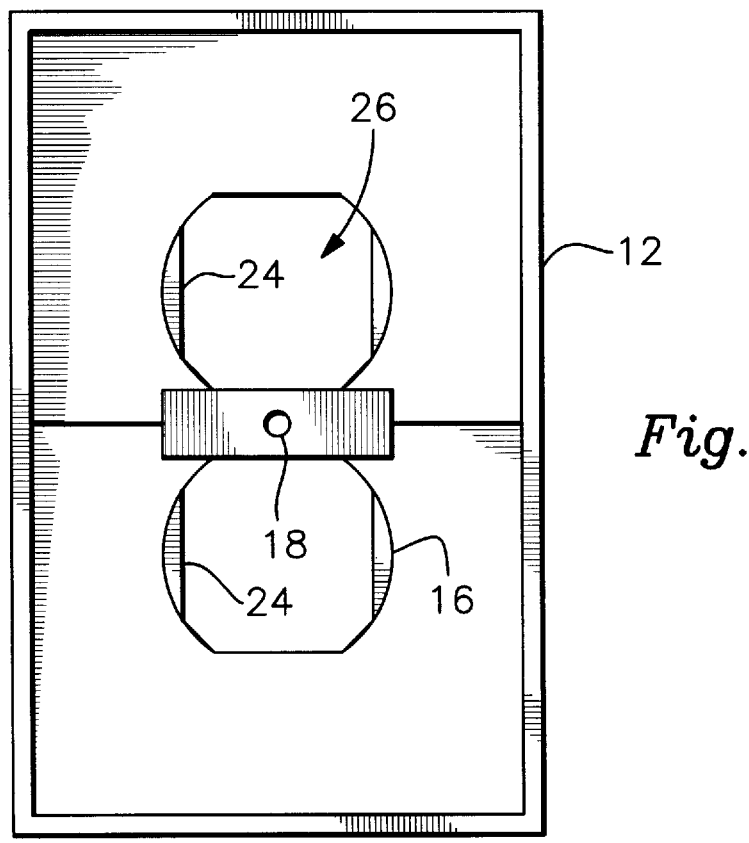
FIG. 9 is a rear elevational view of the apparatus of FIG. 4, however, with both lands being attached to the plate.

Bore hole 18 is received in the plate between openings 14 and 16 for receiving a screw for mounting the plate 12 to a standard wall outlet box. Openings 14 and 16 are adapted to receive a pair of standard electrical receptacles. The top surface 20 of plate 12 should be approximately on the same plane as the top surface of a wall receptacle 22, as shown in FIG. 8.

Figure 2:
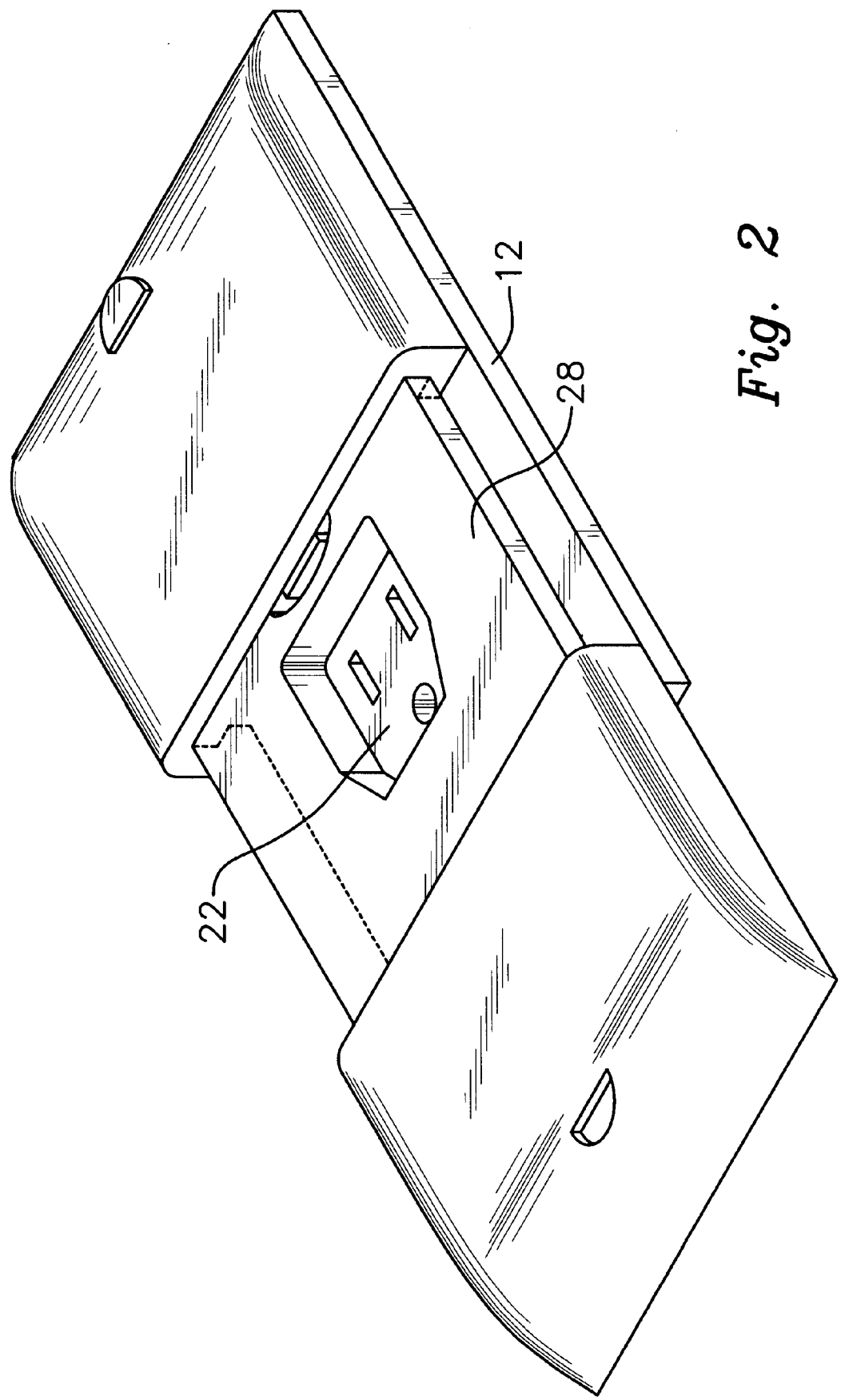
FIG. 2 is a prospective view of the apparatus of FIG. 1, however, with one of the covers in the open position.
Figure 3:
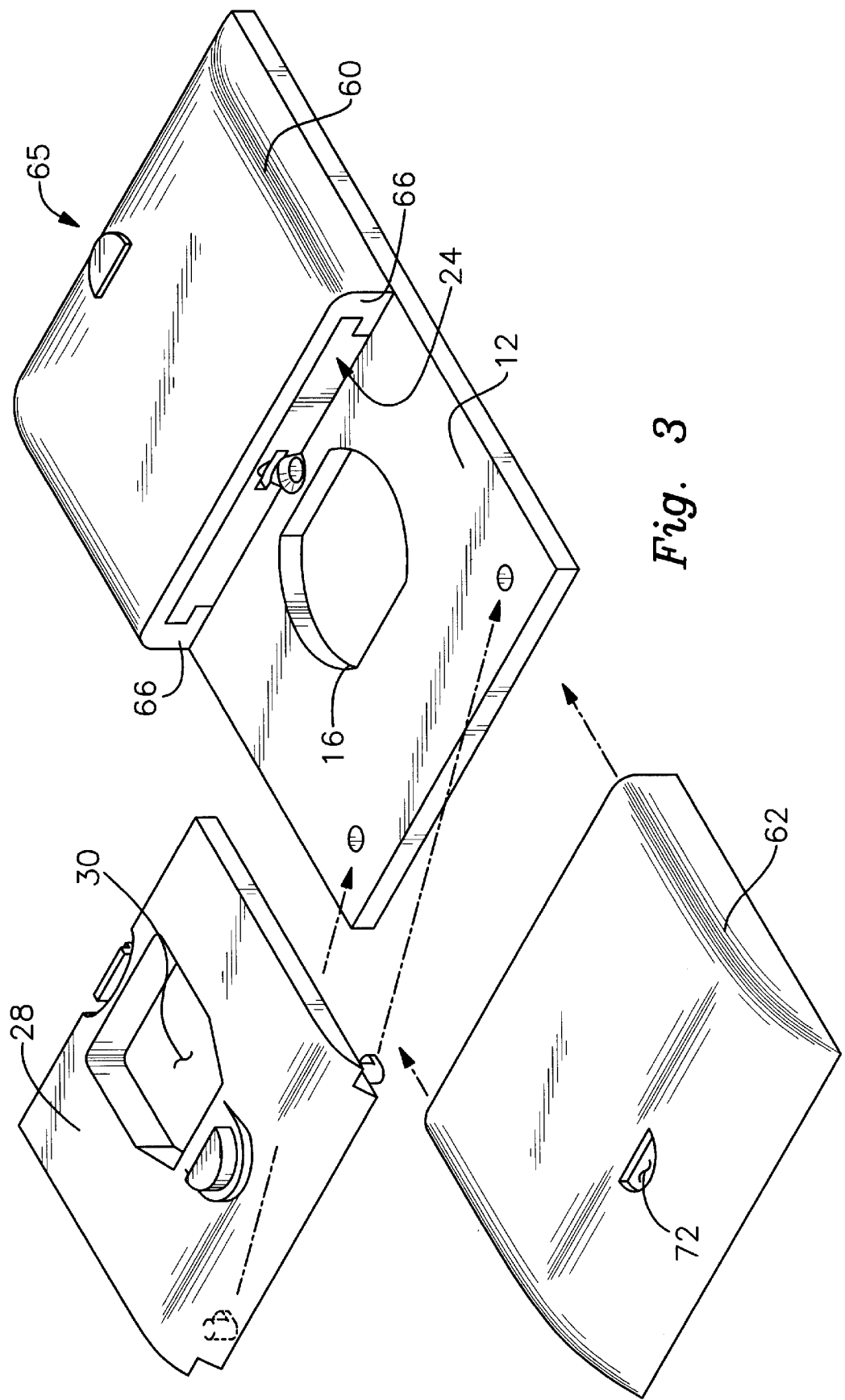
FIG. 3 is an exploded pictorial view of the apparatus of FIG. 1, except that one of the covers is not removed.
Figure 4:
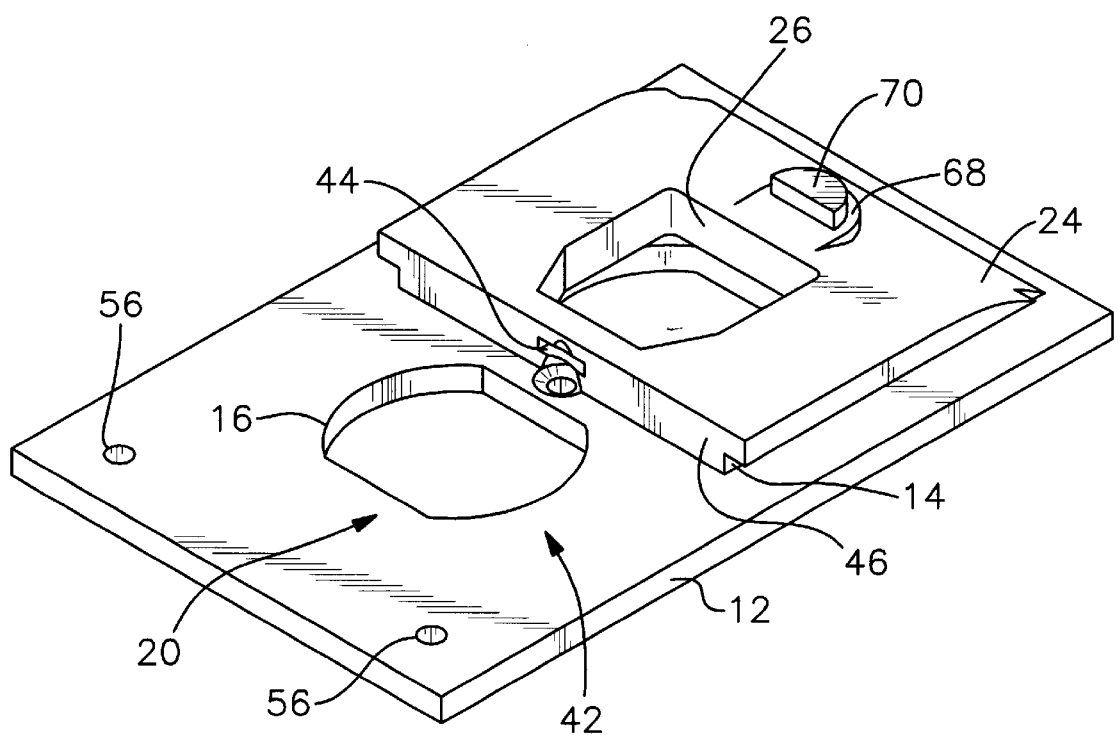
FIG. 4 is a pictorial view of the apparatus of FIG. 1, however, with both covers removed and with the lower land removed.
Figure 5:
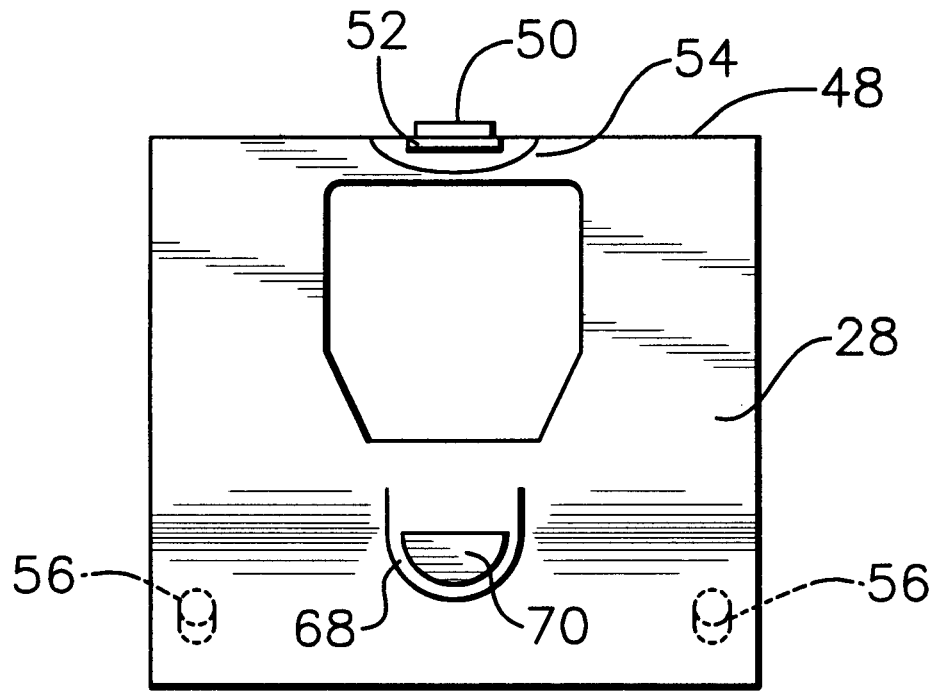
FIG. 5 is a top view of the removable land shown in FIG. 3.
Figure 6:
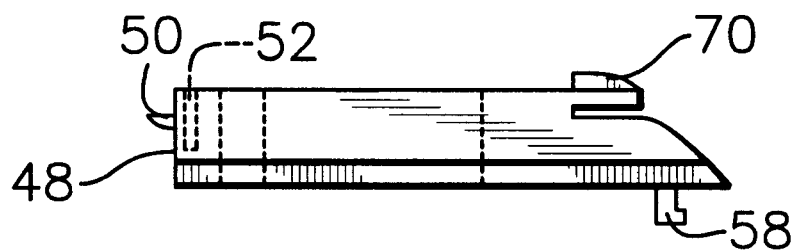
FIG. 6 is a side elevational view of the removable land shown in FIG. 5.
Figure 7:
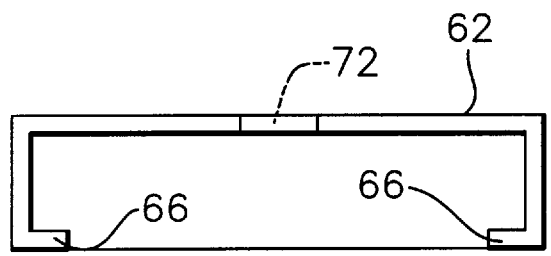
FIG. 7 is a side elevational view of either of the covers of FIG. 1.

Referring now more particularly to FIG. 4, plate 12 includes land 24 attached thereto. Preferably, land 24 is made integral with plate 12 so that land 24 is not removable and forms a single piece part with plate 12. Land 24 includes well 26 therethrough. Well 26 aligns with first opening 14 of plate 12. As shown in FIG. 2, second land 28 is also attached to plate 12. However, as can be seen in FIG. 3, the second land 28 may be readily removed from plate 12. The advantage of the removability of land 28 will be explained later in the description. Land 28 includes well 30 which is aligned with opening 16 of plate 12. Wells 26 and 30 are dimensioned so as to receive a standard three-prong plug with a minimal of clearance between the sides 31 of plug 32 and the sides 34 of the wells. The relationship between the sides of the plug and wells may be better seen in FIG. 8. Thus plug 32 will tightly fit into wells 26 and 30, although, the sides 31 of a plug should not make contact with the sides 34 of the wells.

The thickness of the lands 24 and 28 in the vicinity of wells 26 and 30 are such that the plug cannot be energized unless the exposed plug prongs 40 are below the top surface 29 of the particular land. Thus a person may not touch, or otherwise make contact with, an energized plug prong 40 due to the protection afforded by a land. For a standard plug 32, electrical energy can be applied to prong 40 when they are withdrawn as far as 0.4 inch from the surface of the receptacle. Thus it is preferred that the thickness of each of the lands in the vicinity of its respective well is at least 0.5 inch.

As previously stated, land 28 may be readily removed from plate 12. This feature enables one to utilize this safety apparatus with plugs which are larger than or shaped differently from a standard three-prong plug. As shown in FIGS. 3 and 4, with land 28 removed, the lower portion 42 of plate 12 will appear identical to a standard wall plate. That is, opening 16 is identical in size and shape to an opening in a standard wall plate. Thus odd size plugs may be utilized without the necessity of removing the entire safety apparatus 10 from the wall.

Wall 46 of land 24 abuts against wall 48 of land 28. With both lands attached to plate 12, lands 24 and 28 have the appearance of a single land. Land 24 includes groove 44 in wall 46. Tongue 50 extends from land 28 and is received in groove 44 of land 24, thereby latching land 28 in place. Tongue 50 is attached to hinge 52 forming a spring clip so that land 28 may be readily removed from plate 12. Slot 54 in land 28 provides clearance for spring 52.

Plate 12 includes a pair of holes 56 which align with and receive a pair of studs 58 which extend from the bottom of removable land 28 for further securing the land onto plate 12.

Referring back to FIGS. 1–3, apparatus 10 includes first slidable cover 60 and second slidable cover 62. First slidable cover is received over land 24, and second slidable cover 62 is received over land 28. Each land includes a pair of grooves 64 on opposing sides thereof. Each slidable cover includes a pair of rails 66 which are received in corresponding grooves 64. These grooves and rails permit the cover to slide, but will secure each cover onto its corresponding land.

The covers and lands include a latching mechanism 65 which will hold the cover in the closed position, as shown in FIG. 1, unless the latching mechanism is unlatched. The latching mechanism 65 includes a spring tab 68 which is attached to each land. Spring tab 68 includes raised element or locking button 70. Raised element 70 is received in opening 72 of covers 60 and 62. Raised element 70 is similar in shape as to opening 72, but slightly smaller. To slide the cover and expose one of the wells, the raised element 70 is pressed downwardly through opening 72, thereby unlatching the cover. This feature enables an adult to readily expose the wells, and thus the receptacles, but will inhibit small children from doing so.

Slidable covers 60 and 62 may each have a recessed region on the undersides thereof (not shown) to permit raised element 70 to gently clip into to keep these slidable covers open when an outlet is in use and also to keep these slidable covers from sliding off of apparatus 10.

From the foregoing description of the preferred embodiment of the invention, it will be apparent that many modifications may be made therein. For example, lands 24 and 28 may be formed as a single land having a pair of wells therethrough. It should be understood, therefore, that the preferred embodiment of the invention is an exemplification of the invention only and that the invention is not limited thereto. It is to be understood, therefore, that it is intended in the appended claims to cover all modifications as fall within the true spirit and scope of the invention.

I claim:

1. An electrical outlet safety apparatus comprising:

a plate; said plate having first and second openings therein; said openings in said plate adapted to be placed in register with a pair of adjacent wall mounted electrical receptacles;

a first land attached to said plate; said first land surrounding said first opening in said plate;

a well through said first land; said well through said first land aligning with said first opening in said plate; said well through said first land dimensioned to receive a plug having prongs with minimal clearance for the plug;

a second land removably attached to said plate; said second land surrounding said second opening in said plate;

a well forming an opening through said second land; said well through said second land aligning with said second opening in said plate; said second opening in said plate being larger than the opening formed by said well through said second land; said well through said second land dimensioned to receive a plug with minimal clearance for said plug; said second land being removable so that a larger dimensional plug may be inserted in said second opening in said plate without the need to remove (a) said plate from the wall or (b) said first land from said plate;

each land has a top surface and a predetermined thickness; the thickness of each land is such that a plug cannot be energized unless the plug prongs are below said top surface of said land; said second land being connectable to said first land; said second land being non-integral with said first land.

2. An electrical outlet safety apparatus comprising:

a plate; said plate having first and second openings therein; said openings in said plate adapted to be placed in register with a pair of adjacent wall mounted electrical receptacles;

a first land attached to said plate; said first land surrounding said first opening in said plate;

a well through said first land; said well through said first land aligning with said first opening in said plate; said well through said first land dimensioned to receive a plug having prongs with minimal clearance for the plug;

a second land removably attached to said plate; said second land surrounding said second opening in said plate;

a well forming an opening through said second land; said well through said second land aligning with said second opening in said plate; said second opening in said plate being larger than the opening formed by said well through said second land; said well through said second land dimensioned to receive a plug with minimal clearance for said plug; said second land being removable so that a larger dimensional plug may be inserted in said second opening in said plate without the need to remove said plate from the wall;

each land has a top surface and a predetermined thickness; the thickness of each land is such that a plug cannot be energized unless the plug prongs are below said top surface of said land; said second land is connected to said first land when said first and second lands are attached to said plate; said first land includes a groove; said second land having a spring clip;

a portion of said spring clip received in said groove for securing said second land to said first land.

3. An apparatus as set forth in claim 2, wherein said plate has a pair of holes; a pair of studs extending from said second land; said holes receiving said studs.

4. An apparatus as set forth in claim 1, wherein said first land is made integral with said plate.

5. An electrical outlet safety apparatus comprising:

a plate; said plate having first and second openings therein; said openings in said plate adapted to be placed in register with a pair of adjacent wall mounted electrical receptacles;

a first land attached to said plate; said first land surrounding said first opening in said plate;

a well through said first land; said well through said first land aligning with said first opening in said plate; said well through said first land dimensioned to receive a plug having prongs with minimal clearance for the plug;

a second land removably attached to said plate; said second land surrounding said second opening in said plate;

a well forming an opening through said second land; said well through said second land aligning with said second opening in said plate; said second opening in said plate being larger than the opening formed by said well through said second land; said well through said second land dimensioned to receive a plug with minimal clearance for said plug; said second land being removable so that a larger dimensional plug may be inserted in said second opening in said plate without the need to remove said plate from the wall;

first and second covers; said first cover slidably received over said first land; said second cover slidably received over said second land.

6. An apparatus as set forth in claim 5, wherein said first and second covers are adapted to be slid to open and closed positions; when one of said covers is in the closed position, access to the well in the corresponding land is denied, and when one of said covers is in the open position, access to the well in the corresponding land is permitted.

7. An apparatus as set forth in claim 6, wherein each land has a pair of elongated grooves; each cover having a pair of elongated rails; said rails in each cover are received in the grooves of its corresponding land for securing said cover to said corresponding land and permitting said cover to slide.

8. An apparatus as set forth in claim 5, wherein each said cover has an opening; each land having a locking button protruding from a top surface; said locking button received in said opening in said cover when said cover is in a closed position.

9. An apparatus as set forth in claim 8, wherein said locking button is on a spring tab, whereby when said spring tab is depressed, said locking button comes out of said opening in said cover so that said cover may be readily slid.

10. An electrical outlet safety apparatus comprising:

a plate; said plate having first and second openings therein; said openings in said plate adapted to be placed in register with a pair of adjacent wall mounted electrical receptacles;

a land attached to said plate; said land surrounding said first and second openings in said plate;

first and second wells through said land; said first well aligning with said first opening in said plate and said second well aligning with said second opening in said plate; said wells being dimensioned to receive plugs having prongs with minimal clearance for said plugs;

at least one cover; said at least one cover being slidably received over at least a portion of said land.

11. An apparatus as set forth in claim 10, wherein said at least one cover includes first and second covers; said first and second covers are adapted to be slid to open and closed positions, and wherein when one of said covers is in the closed position, access to the well in corresponding land portion is denied, and when one of said covers is in the open position, access to the well in said corresponding land portion is permitted.

12. An apparatus as set forth in claim 11, wherein each land portion has a pair of elongated grooves; each cover having a pair of elongated rails; each said rails in each cover being received in one of said grooves for securing said cover to one of said land portions and permitting said cover to slide.

13. An apparatus as set forth in claim 10, wherein said at least one cover has an opening; said land portion having a locking button protruding from a top surface thereof; said locking button received in said opening of said at least one cover when said at least one cover is in a closed position.

14. An apparatus as set forth in claim 13, wherein said locking button is on a spring tab, whereby when said spring tab is depressed, said locking button comes out of said opening in said at least one cover so that said at least one cover may be readily slid.

15. An apparatus as set forth in claim 10, wherein said land includes first and second land portions; said first well being in said first land portion, and said second well being in said second land portion; said second land portion removably attached to said plate; said second opening in said plate being larger than the opening formed by said well in said second land portion; said second land portion being removable so that a larger dimensioned plug may be inserted in said second opening in said plate without the need to remove said plate from the wall.

16. An apparatus as set forth in claim 15, wherein each land portion has a top surface and a predetermined thickness; said thickness of each land portion is such that the associated plug will not be energized unless the plug prongs are located below said top surface of said each land portion.

17. An apparatus as set forth in claim 16, wherein said second land portion is connected to said first land portion.

18. An apparatus as set forth in claim 15, wherein said first land portion includes a groove; said second land portion having a spring clip; a portion of said spring clip received in said groove for securing said second land portion to said first land portion.

19. An apparatus as set forth in claim 16, wherein said plate has a pair of holes; said second land portion having a bottom; a pair of studs extending from said bottom of said second land portion; said holes receiving said studs.

* * * * *